US008955545B2

(12) United States Patent
Murabayashi et al.

(10) Patent No.: US 8,955,545 B2
(45) Date of Patent: Feb. 17, 2015

(54) FUEL TANK SYSTEM

(75) Inventors: Shinya Murabayashi, Saitama (JP); Tamon Kimura, Saitama (JP); Kiyofumi Shida, Saitama (JP); Hiroaki Watanabe, Saitama (JP); Kengo Kobayashi, Saitama (JP); Yutaka Utsumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/637,033

(22) PCT Filed: Mar. 31, 2011

(86) PCT No.: PCT/JP2011/058246
§ 371 (c)(1),
(2), (4) Date: Sep. 25, 2012

(87) PCT Pub. No.: WO2011/125851
PCT Pub. Date: Oct. 13, 2011

(65) Prior Publication Data

US 2013/0008524 A1 Jan. 10, 2013

(30) Foreign Application Priority Data

Mar. 31, 2010 (JP) ................................ 2010-083382

(51) Int. Cl.

| | |
|---|---|
| ***F04B 49/00*** | (2006.01) |
| ***F02M 37/00*** | (2006.01) |
| ***F16L 43/00*** | (2006.01) |
| ***F02M 37/10*** | (2006.01) |
| ***F02M 37/02*** | (2006.01) |

(52) U.S. Cl.
CPC ......... *F02M 37/0094* (2013.01); *F02M 37/106* (2013.01); *F02M 37/025* (2013.01)
USPC .................. 137/565.11; 137/565.22; 123/514

(58) Field of Classification Search
USPC ............... 137/143, 142, 565.22, 574, 565.11; 123/514; 73/305, 306
See application file for complete search history.

(56) References Cited

U.S. PATENT DOCUMENTS 2,557,438 A * 6/1951 Johnson .................. 137/565.11
4,834,132 A 5/1989 Sasaki et al.
5,743,239 A * 4/1998 Iwase ............................ 123/514

(Continued)

FOREIGN PATENT DOCUMENTS

JP 63-085254 A 4/1988
JP 63-285260 A 11/1988

(Continued)

*Primary Examiner* — Craig Schneider
*Assistant Examiner* — Craig J Price
(74) *Attorney, Agent, or Firm* — Carrier Blackman & Associates, P.C.; Joseph P. Carrier; William P. Blackman

(57) ABSTRACT

Provided is a fuel tank system wherein the liquid levels of fuel in two fuel storage portions can be equally maintained, and the fuel amount in each fuel tank can be estimated with a high degree of accuracy. The fuel tank system is provided with a fuel tank in which a main tank portion and a subsidiary tank portion are formed; a siphon tube which extends from the main tank portion to the subsidiary tank portion, to transfer fuel from one tank portion to the other tank portion; and an electronic control unit (ECU) for determining whether or not the fuel is transferred via the siphon tube (in the transfer state). The ECU determines that the fuel is in the transfer state when the change rate of a sender signal is equal to or less than a predetermined threshold value (VF_th).

5 Claims, 5 Drawing Sheets

(56) References Cited

U.S. PATENT DOCUMENTS

| | | | | |
|---|---|---|---|---|
| 5,797,377 | A * | 8/1998 | Fischerkeller | 123/514 |
| 5,979,485 | A * | 11/1999 | Tuckey et al. | 137/574 |
| 6,113,354 | A * | 9/2000 | Meese et al. | 123/514 |
| 6,276,342 | B1 * | 8/2001 | Sinz et al. | 123/514 |
| 6,371,153 | B1 * | 4/2002 | Fischerkeller et al. | 137/565.22 |
| 6,488,015 | B2 * | 12/2002 | Isobe | 123/520 |
| 6,505,644 | B2 * | 1/2003 | Coha et al. | 137/565.22 |
| 6,532,941 | B2 * | 3/2003 | Begley et al. | 123/514 |
| 6,553,973 | B1 * | 4/2003 | Coha et al. | 137/565.33 |
| 6,607,005 | B2 * | 8/2003 | Viebahn et al. | 137/565.22 |
| 6,609,537 | B1 * | 8/2003 | Horrer et al. | 123/514 |
| 6,792,966 | B2 * | 9/2004 | Harvey | 123/514 |
| 6,863,084 | B2 * | 3/2005 | Aschoff | 137/565.22 |
| 6,871,640 | B2 * | 3/2005 | Atwood et al. | 123/509 |
| 6,907,899 | B2 * | 6/2005 | Yu et al. | 137/565.22 |
| 7,013,844 | B2 * | 3/2006 | Oda | 123/3 |
| 7,066,153 | B2 * | 6/2006 | Vitalis et al. | 123/514 |
| 7,246,606 | B2 * | 7/2007 | Tokumaru et al. | 123/514 |
| 7,500,473 | B2 * | 3/2009 | Kobayashi et al. | 123/509 |
| 7,730,877 | B2 * | 6/2010 | Suda et al. | 137/565.22 |
| 8,387,658 | B2 * | 3/2013 | Markefka | 137/565.22 |
| 2004/0182454 | A1 * | 9/2004 | Atwood et al. | 137/574 |
| 2009/0150041 | A1 * | 6/2009 | Hill et al. | 123/520 |

FOREIGN PATENT DOCUMENTS

| | | | |
|---|---|---|---|
| JP | 5-77578 | U | 10/1993 |
| JP | 10-061515 | A | 3/1998 |

* cited by examiner

FUEL TANK SYSTEM

TECHNICAL FIELD

The present invention relates to a fuel tank system. More specifically, it relates to a fuel tank system that is equipped with a fuel tank in which two fuel storage portions are formed, and that transfers fuel between these fuel storage portions from either one to the other by way of a siphon tube.

BACKGROUND ART

Fuel tanks have been provided to vehicles with an internal combustion engine as the source of power in order to store the fuel supplying this internal combustion engine. Fuel tanks are formed in shapes suited to the vehicle specific layout; however, the development of so-called saddle-type fuel tanks suited to various types of vehicles such as four-wheel drive cars, rear-wheel drive cars, and hybrid cars has been active in recent years.

Saddle-type fuel tanks have a cross section of a tank bottom along the vehicle width direction that is a concave shape, whereby the two fuel storage portions of a first fuel storage portion and a second fuel storage portion are formed. With such saddle-type fuel tanks, it is necessary to provide a device to keep the liquid level of fuel equal in the two fuel storage portions in order to prevent an excessive amount of fuel from accumulating in either one of the fuel storage portions.

As an example of a fuel tank system equipped with such a device to keep the liquid levels equal, for example, Patent Document 1 shows one provided with a siphon tube that transfers fuel from either one of the first fuel storage portion and the second fuel storage portion to the other.

Patent Document 1: Japanese Unexamined Patent Application, Publication No. H10-61515

DISCLOSURE OF THE INVENTION

Problems to be Solved by the Invention

With a fuel tank system using such a siphon tube, the fuel will not transfer by actively applying motive power by a pump or the like; therefore, there is a problem in that, while the liquid levels of fuel in the two fuel storage portions can be kept equal with a relatively simple structure, it is difficult to distinguish if a change in the liquid level of fuel is due to transfer of fuel via the siphon tube, or is due to fuel filling. As a result, even in a case of the liquid level of fuel rising due to transfer of the fuel via the siphon tube, for example, it may be misjudged as the liquid level of fuel rising due to fuel filling, a result of which the fuel amount inside of the fuel tank cannot be accurately estimated.

The present invention has an object of providing a fuel tank system that keeps the liquid levels of fuel in two fuel storage portions equal by way of a siphon tube, and allows for the estimation of the fuel amount inside of the fuel tank with high precision.

Means for Solving the Problems

In order to achieved the above-mentioned object, a fuel tank system for a vehicle (e.g., the fuel tank system 1 described later) is provided that includes: a fuel tank (e.g., the fuel tank 10 described later) in which a first fuel storage portion (e.g., the main tank portion 16 described later) and a second fuel storage portion (e.g., the subsidiary tank portion 18 described later) are formed; and a siphon tube (e.g., the siphon tube 34 described later) that is disposed to span the first and second fuel storage portions, and transfers fuel from either one among the first and second fuel storage portions to the other one. The fuel tank system further includes a transfer state determination means (e.g., the electronic control unit 60, hereinafter referred to as ECU, described later) for determining a transfer state of fuel.

According to the present invention, in a fuel tank system equipped with a siphon tube disposed to span two fuel storage portions, a transfer determination means is provided for determining a transfer state of fuel, i.e. a state in which fuel is being transferred from one fuel storage portion to the other fuel storage portion by way of the siphon tube. Since it is thereby possible to determine whether the change in liquid level inside of the fuel tank is caused by the transfer of fuel by way of the siphon tube, it can be determined with high precision a state in which fuel is being filled as a result. In addition, since it is possible to determine with high precision a state in which fuel is being filled, the fuel amount inside of the fuel tank can also be estimated with high precision as a result.

In this case, it is preferable for the fuel tank system to further include a liquid level detection means (e.g., the sender unit 50 described later) for detecting a liquid level of fuel stored in either of the first and second fuel storage portions, in which the transfer state determination means determines that fuel is in a transfer state in a case of a rate of change (e.g., rate of increase in fuel VF described later) in a detection value of the liquid level being no more than a predetermined threshold (e.g., the threshold VF_th described later), and determines that fuel is not in a transfer state in a case of a rate of change in the detection value of the liquid level being greater than the threshold.

It should be noted that, in the present invention, the above-mentioned rate of change in the detection value of the liquid level also includes that using the rate of change in a parameter substantially proportional to the detection value of the liquid level.

According to the present invention, the transfer state determination means determines that the fuel is in a transfer state in a case of the rate of change in the detection value of the liquid level of fuel stored in either of the two fuel storage portions being no more than the predetermined threshold, and determines the fuel to not be in a transfer state in a case of the rate of change in the detection value of the liquid level being greater than the threshold. The rate of change in the liquid level inside of the fuel tank, when comparing between that due to transfer in the siphon tube and that due to fuel filling, is smaller due to transfer in the siphon tube. Therefore, since it is possible to determine a transfer state of fuel with higher precision by way of the transfer state determination means, the estimation accuracy of the fuel amount inside of the fuel tank can be raised further as a result.

In this case, it is preferable for the fuel tank system to further include a fuel filling state determination means for determining that fuel is in a fuel filling state when the vehicle is stopped, in a case of the transfer state determination means determining that fuel is not in the transfer state and an amount of change in the detection value of the liquid level in a predetermined period being greater than a predetermined threshold.

It should be noted that, in the present invention, the above-mentioned amount of change in the detection value of the liquid level also includes that using the amount of change in a parameter substantially proportional to the detection value of this liquid level.

In a case of the liquid level changing while the vehicle is stopped, the cause for this change in liquid level is considered to be due to fuel filling in a case of not being due to transfer. According to the present invention, the fuel filling state determination means determines the fuel being the filling state when the vehicle is stopped, in a case of it being determined that the fuel is not in the transfer state by way of the above-mentioned transfer state determination means, and the amount of change in the detection value of the liquid level (e.g., the increase amount WF described later) in a predetermined period being greater than a predetermined threshold (e.g., the threshold WF_th described later). Since it is thereby possible to determine as being in the fuel filling state with high precision, the fuel amount inside of the fuel tank can be estimated with high precision as a result.

EXPLANATION OF REFERENCE NUMERALS

1 fuel tank system
10 fuel tank
16 main tank portion (first fuel storage portion)
18 subsidiary tank portion (second tank storage portion)
34 siphon tube
50 sender unit (liquid level detection means)
60 ECU (transfer state determination means, fuel filling state determination means)
70 fuel meter (meter)

PREFERRED MODE FOR CARRYING OUT THE INVENTION

Hereinafter, an embodiment of the present invention will be explained while referencing the drawings.

Figure 1:
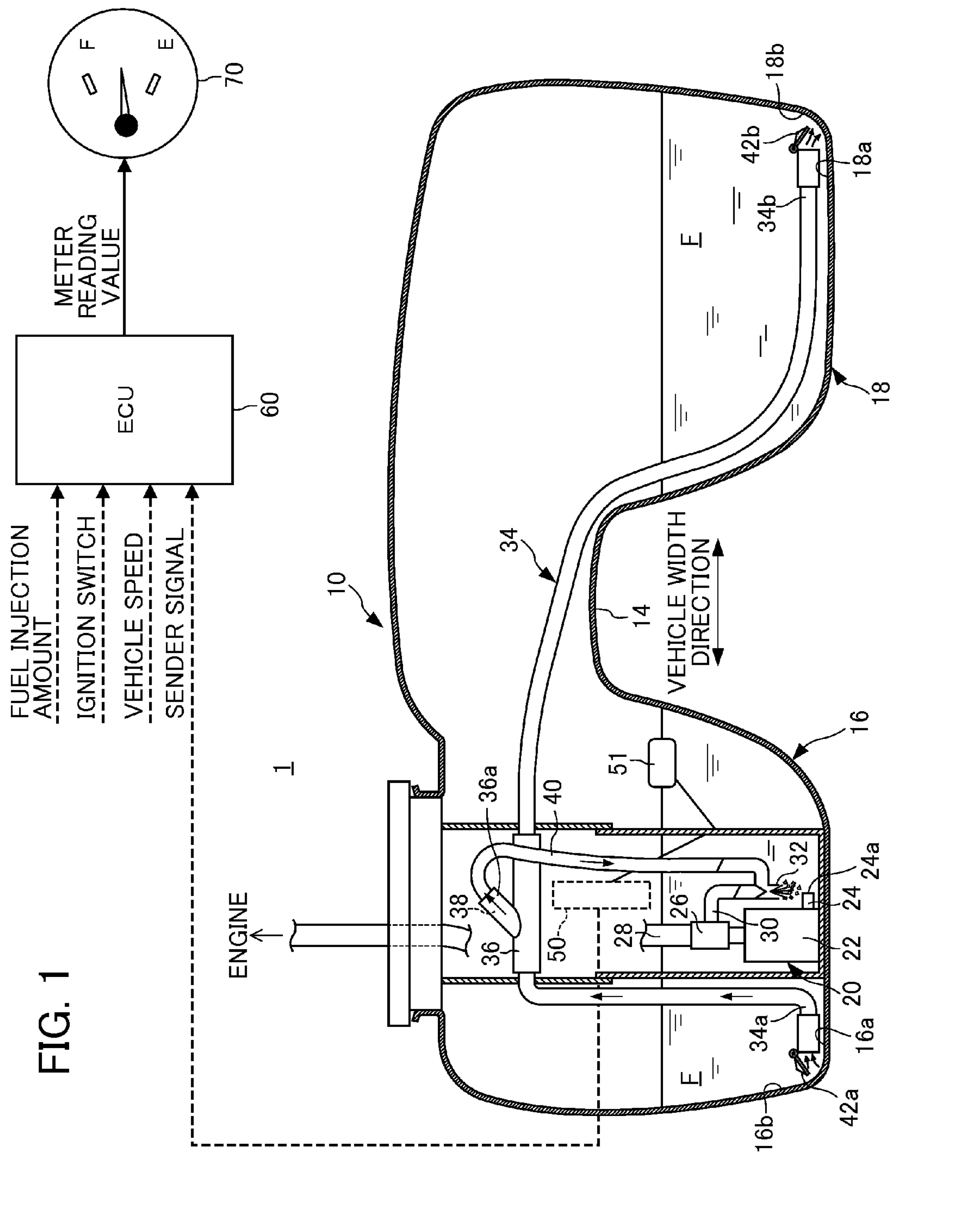
FIG. 1 is a schematic diagram showing the configuration of a fuel tank system according to an embodiment of the present invention.

FIG. 1 is a schematic diagram showing the configuration of a fuel tank system 1 according to the present embodiment.

The fuel tank system 1 is configured to include a saddle-type fuel tank 10, and an electronic control unit (hereinafter referred to as "ECU") connected to this fuel tank 10, and is equipped in a vehicle that is not illustrated. It should be noted that a cross-sectional view of the fuel tank 10 along the vehicle width direction is shown in FIG. 1.

A saddle portion 14 curved in a convex shape facing upwards is provided at substantially the center of a bottom part of the fuel tank 10, and a main tank portion 16 serving as a first fuel storage portion and a subsidiary tank portion 18 serving as a second storage portion are formed to be demarcated by this saddle portion 14. The fuel tank is saddle shaped with a concave recess extending upwardly at a lower surface of the tank, and the first and second fuel storage portions are disposed on opposite sides of the concave recess and open into each other through a space within the fuel tank above the concave recess.

A fuel pump module 20 that draws in and supplies, to an engine not illustrated, the fuel stored inside of the fuel tank 10 is provided in the main tank portion 16.

The fuel pump module 20 includes a fuel pump 22, and a pressure regulator 26 that is coupled to this fuel pump 22. The fuel pump 22 draws in fuel stored in the main tank portion 16 from a fuel suction port 24*a* by way of a drawing jet pump 24 that opens to a bottom 16*a* of the main tank portion 16, and pressure feeds the pressure regulator 26. A fuel line 28 communicating to the engine, and a return branching pipe 30 to which a suction jet pump 32 is provided to a leading end side thereof are coupled to the pressure regulator 26.

A siphon tube 34 is disposed inside of the fuel tank 10, spanning the bottom 16*a* of the main tank portion 16 and a bottom 18*a* of the subsidiary tank portion 18. One end side of a suction line 40 is coupled via a three-way joint 36 in the middle on an upper side of this siphon tube 34. In addition, the other end side of this suction line 40 is coupled to a suction side (negative pressure side) of the aforementioned suction jet pump 32. A check valve 38 is provided to a junction 36*a* of the three-way joint 36 on one end side of the suction line 40, whereby fuel is only allowed to flow from a siphon tube 34 side to a suction jet pump 32 side.

An open end 34*a* of the siphon tube 34 on a main tank portion 16 side is disposed at the bottom 16*a* of the main tank portion 16 more towards an outer side in the vehicle width direction than the suction jet pump 32, to be distanced from an inner wall 16*b* on an outer side in the vehicle width direction of the main tank portion 16. A diversion valve 42*a* is installed at this open end 34*a* that closes the open end 34*a* when detecting a gas and opens the open end 34*a* when detecting a liquid.

An open end 34*b* of the siphon tube 34 on a subsidiary tank portion 18 side is disposed at the bottom 18*a* of the subsidiary tank portion 18 to be distanced from the inner wall 18*b* on the outer side in the vehicle width direction. A diversion valve 42*b* is installed at this open end 34*b* that closes the open end 34*b* when detecting a gas and opens the open end 34*b* when detecting a liquid.

In addition, a sender unit 50 that detects the liquid level of fuel stored in the main tank portion 16 is provided inside of the fuel tank 10. The sender unit 50 outputs a detection signal (hereinafter referred to as "sender signal") substantially proportional to the position of a float 51 that floats on the liquid surface of the fuel stored in the main tank portion 16, i.e. liquid level of the fuel stored in the main tank portion 16, and this sender signal is detected by an ECU 60.

Operation of the fuel tank 10 configured in the above way will be explained.

Figure 2:
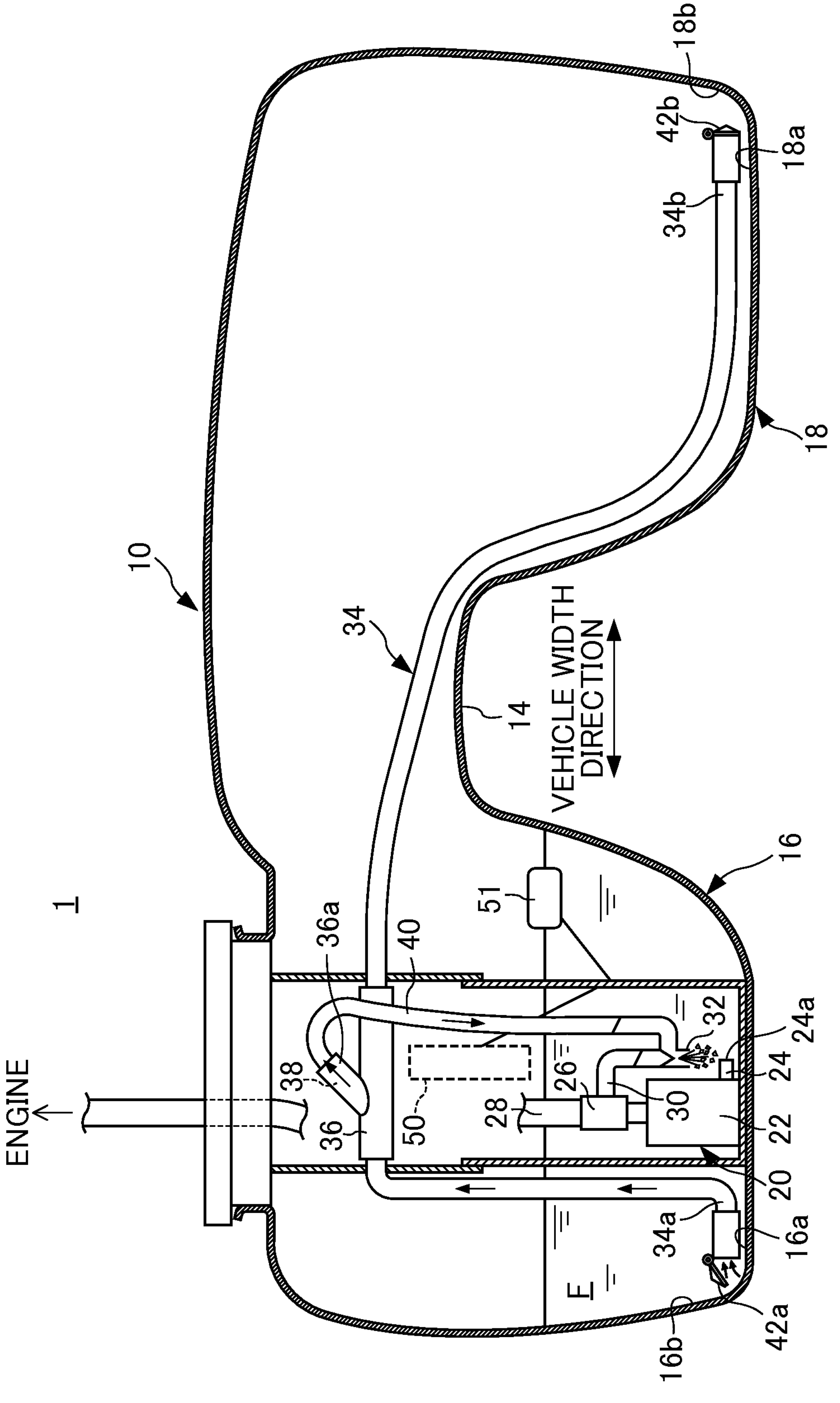
FIG. 2 is a view showing a state in which fuel is being stored in only the main tank portion of a fuel tank according to the embodiment.

For example, as shown in FIG. 2, a case of starting of the engine being performed in a state in which fuel F is only being stored in the main tank portion 16 (e.g., at the time of shipment from the factory, etc.) will be explained.

In this case, first, the fuel pump 22 of the fuel pump module 20 is driven, and fuel F stored in the main tank portion 16 is sucked in from the fuel suction port 24*a* under the action of the drawing jet pump 24. The fuel F sucked in is supplied from the pressure regulator 26 through the fuel line 28 to the engine.

Meanwhile, a portion of the fuel F sucked in from the fuel suction port 24*a* is supplied to the suction jet pump 32 via the branch line 30, and a negative pressure is generated at the suction line 40. The suction line 40 communicates with the siphon tube 34 via the three-way joint 36, and the inside of this siphon line 34 is suctioned. Herein, the open end 34*a* of the siphon tube 34 on the main tank portion 16 side opens due to being in the fuel F by the diversion valve 42*a* detecting a liquid, and the open end 34*b* on the subsidiary tank portion 18 side closes by the diversion valve 42*b* detecting a gas. As a result, when the inside of the siphon tube 34 is suctioned under the action of the suction jet pump 32, the fuel F drawn up from the open end 34*a* of this siphon tube 34 on the main tank portion 16 side is transferred to the open end 34*b* on the subsidiary tank portion 18 side. The open end 34*b* opens when the fuel F being supplied, and the fuel F on the main tank portion 16 side is transferred to the subsidiary tank portion 18 side. Thereafter, a siphon function is exhibited by the siphon tube 34, a result of which the fuel F is transferred from either one among the main tank portion 16 and the subsidiary tank portion 18 to the other one so that the liquid level of fuel F in the main tank portion 16 and the liquid level of fuel transferred to the subsidiary tank portion 18 become the same height.

Figure 3:
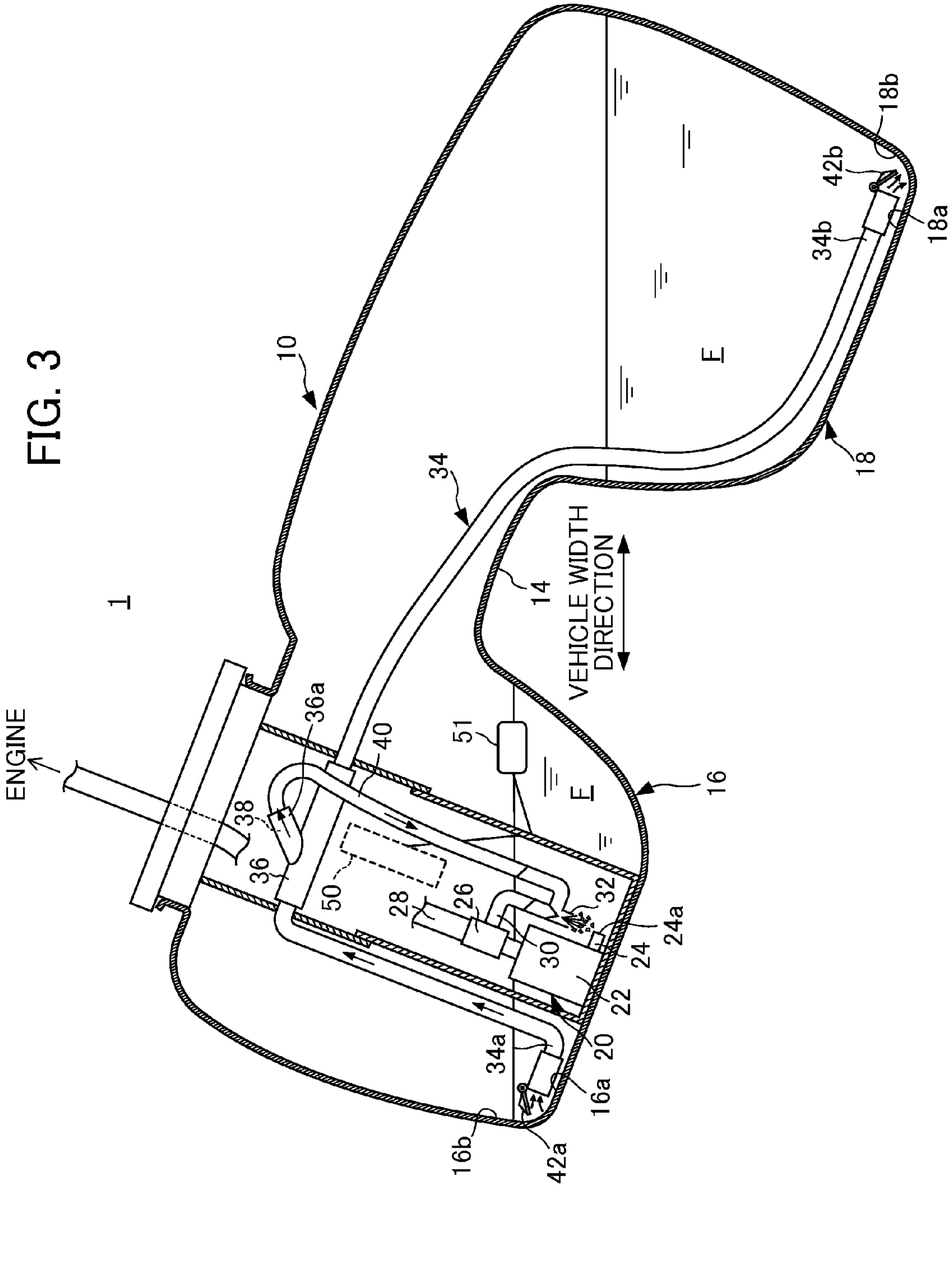
FIG. 3 is a view showing a state in which the fuel tank according to the embodiment is tilted.

In addition, in a state in which the fuel tank 10 is tilted as shown in FIG. 3, for example, the fuel F inside of the main tank portion 16, which is the higher side, is transferred to the subsidiary tank portion 18, which is the lower side, by way of the siphon function of the siphon tube 34, whereby the liquid levels of fuel inside of the main tank portion 16 and subsidiary tank portion 18 are adjusted as to become the same height.

In addition, during engine stop, there is no returning from the siphon line 40 to the siphon tube 34 side under the action of the check valve 38 provided in the junction 36*a* of the three-way joint 36. Therefore, even during engine stop, the siphon function of the siphon tube 34 is exhibited, and the liquid levels of fuel in the main tank portion 16 and the subsidiary tank portion 18 are adjusted so as to be the same.

Returning to FIG. 1, the ECU 60 includes an input circuit that has functions such as of shaping input signal wave forms from several kinds of sensor, correcting the voltage levels to predetermined levels, and converting analog signals to digital signals, and a central processing unit (hereinafter referred to as "CPU"). In addition to this, the ECU 60 includes a storage circuit that stores calculation programs executed by the CPU and calculation results, and an output circuit that outputs control signals to the fuel meter 70.

In addition to the sender signal output from the aforementioned sender unit 50, various signals are input to the ECU 60 such as of a fuel amount supplied from the fuel tank 10 and injected into the engine (hereinafter referred to as "fuel injection amount"), vehicle speed of the vehicle equipped with the fuel tank system 1, and an ON/OFF signal from an ignition switch that is not illustrated. The ECU 60 estimates the fuel amount stored inside of the fuel tank 10 based on this sender signal, fuel injection amount, vehicle speed, signal from the ignition switch, etc., and sends a meter reading value to the fuel meter 70. The fuel meter 70 displays a fuel amount inside the fuel tank 10 in accordance with this meter reading value.

Hereinafter, fuel meter 70 control configured in the ECU 60, i.e. a module that calculates the meter reading value, will be explained in detail while referencing FIGS. 4 to 6.

Figure 4:
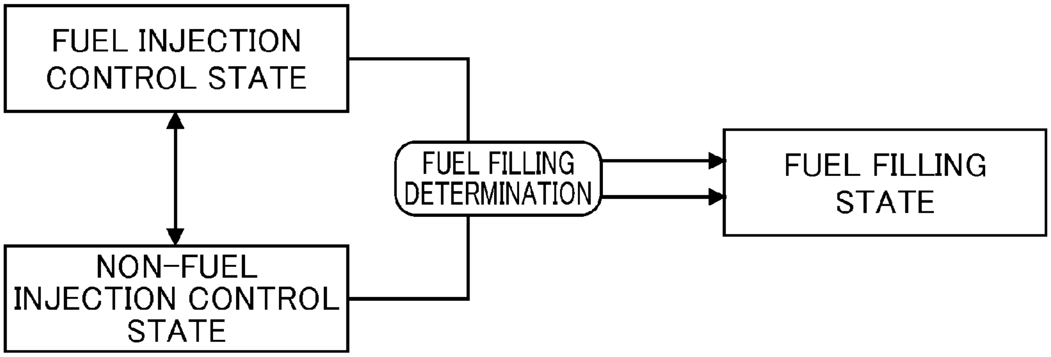
FIG. 4 is a view schematically showing the concept of meter control by an ECU according to the embodiment.

FIG. 4 is a view schematically showing the concept of meter control by the ECU.

In order for the ECU to estimate the fuel amount inside of the fuel tank precisely, i.e. so that the meter reading value does not change greatly depending on the travelling state of the vehicle, the state of meter control is switched between the three types of fuel injection control state, non-fuel injection control state, and fuel filling state, and then, based on the algorithms established for each of these three types of control states, estimates the fuel amount stored inside of the fuel tank, and calculates the reading value of the meter based on this estimation. Hereinafter, the algorithms for estimating the fuel amount inside of the fuel tank for each of the fuel injection control state, non-fuel injection state, and fuel filling state will be explained.

1. Fuel Injection Control State

When the state of meter control is in the fuel injection control state, the ECU estimates the fuel amount inside of the fuel tank by successively subtracting, from a predetermined initial value of the fuel amount inside of the fuel tank, the fuel of an amount provided in travel of the vehicle, and further calculates the meter reading value based on this estimated fuel amount. Therefore, in this case, the fuel amount inside of the fuel tank, i.e. a reading value of the meter, basically only declines and does not rise. More specifically, when the state of meter control is in the fuel injection control state, the ECU estimates the fuel amount in the fuel tank based on the two types of parameters of the sender signal and the fuel injection amount.

It should be noted that, in a case of a predetermined condition having been satisfied when the state of meter control is in the fuel injection control state, the state of meter control transitions from the fuel injection control state to the non-fuel injection control state.

In addition, when the state of meter control is in the fuel injection control state, the state of meter control transitions from the fuel injection control state to the fuel filling state in response to being determined as being in a fuel filling state by way of the sequence explained later while referencing FIGS. 5 and 6.

2. Non-Fuel Injection Control State

When the state of meter control is in the fuel injection control state, the ECU estimates the fuel amount inside of the fuel tank based on the sender signal, and further calculates the meter reading value based on this estimated fuel amount. Therefore, in this case, the fuel amount inside of the fuel tank, i.e. a meter reading value, is different from the above-mentioned fuel injection control state and not only declines, but may also rise.

It should be noted that, in a case of a predetermined condition having been satisfied when the state of meter control is in the non-fuel injection control state, the state of meter control transitions from the non-fuel injection control state to the fuel injection control state.

In addition, when the state of meter control is in the fuel injection control state, the state of meter control transitions from the non-fuel injection control state to the fuel filling state in response to being determined as being in the fuel filling state by way of the sequence explained later while referencing FIGS. 5 and 6.

3. Fuel Filling State

As described above, in the fuel injection control state, the fuel amount inside of the fuel tank is estimated by subtracting the fuel injection amount from the initial value for the fuel amount inside of the fuel tank. With the fuel tank system of the present embodiment in which a saddle-type fuel tank is adopted, the liquid level change due to the transfer of fuel between the main tank portion and subsidiary tank portion, tilting of the fuel tank, etc. becomes an issue in a case of estimating the fuel amount inside of the fuel tank with high precision. On the other hand, by estimating the fuel amount based on the subtraction of the fuel injection amount from an initial value, it becomes possible to estimate irrespective of the liquid level change of fuel.

However, in this case, estimating the initial value of the fuel amount in the fuel injection control state, i.e. the fuel amount after filling fuel to inside of the fuel tank, quickly and with high precision becomes important. Therefore, when the state of meter control is in the fuel filling state, the ECU estimates the fuel amount inside of the fuel tank after fuel filling has finished, based on the plurality of parameters such as the sender signal and the rate of change of the sender signal, and further calculates the meter reading value based on this estimated fuel amount.

4. Sequence for Determination of Fuel Filling State

As described above, with the fuel tank system of the present embodiment in which a saddle-type fuel tank is adopted, in order to always estimate the fuel amount inside of the fuel tank with high precision, it is necessary to be able to estimate the fuel amount after fuel filling has finished quickly and with high precision. As a result, determining with high precision whether or not being in a state in which fuel is being filled also becomes important. In particular, with the fuel tank system of the present embodiment providing a siphon tube, the rise in the liquid level inside of the main tank portion is not only caused by the filling of fuel, and that caused by transfer from the subsidiary tank portion side to the main tank portion side via the siphon tube is also included. As a result, in the determination of filling of fuel, determining that a change in the liquid level is due to transfer of the fuel via the siphon tube also becomes important. Hereinafter, a sequence for the determination of the fuel filling state in the present embodiment will be explained while referencing FIGS. 5 and 6.

Figure 5:
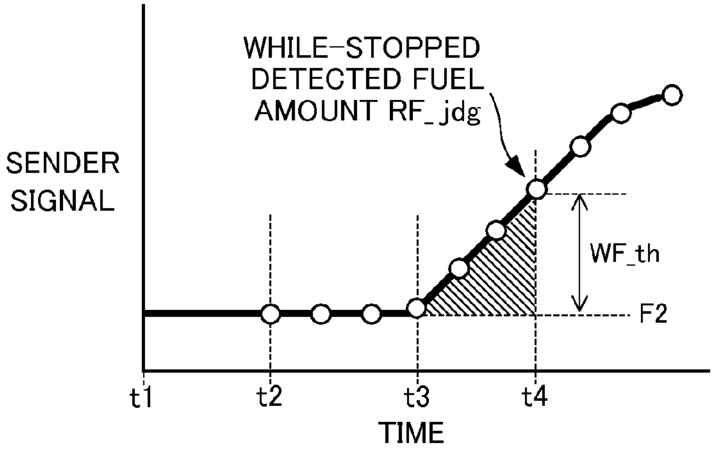
FIG. 5 is a graph showing an example of a time chart of a sender signal during fuel filling.

FIG. 5 is a graph showing an example of a time chart of the sender signal when stopping the vehicle (vehicle speed is 0 km/h), and filling fuel. FIG. 5 shows the change in the sender signal in a case of the vehicle that was in motion at time t1 stopping, and the filling of fuel being initiation while the vehicle is stopped at time t3.

First, the ECU samples the sender signal at time t2 after a predetermined time since the vehicle speed became 0 (km/h) and the vehicle stopped, and then stores the fuel amount corresponding to the sender signal sampled at this time as a reference fuel amount when stopped. Herein, the fuel amount corresponding to the sender signal refers to the fuel amount inside of the fuel tank uniquely calculated from the value of the sender signal using a map (not illustrated) showing the relationship between the volume of the fuel tank and the liquid level. However, although the sender signal is a signal that is substantially proportional to the liquid level of fuel stored in the main tank portion as described above, and the liquid level of fuel stored in the subsidiary tank portion generally differs, in the present embodiment, it is assumed that the liquid level inside of the main tank portion and the liquid level inside of the subsidiary tank portion are the same, and the fuel amount corresponding to the sender signal is calculated using the above-mentioned map.

Thereafter, the ECU samples the sender signal at a predetermined period, and stores the fuel amount corresponding to the sender signal at this time as a while-stopped detected fuel amount RF_jdg (refer to white circles in FIG. 5).

At this time, the ECU calculates a rate of increase VF in fuel amount based on a difference between a current sampling value of the while-stopped detected fuel amount RF_jdg and a previous sampling value, while calculating the while-stopped detected fuel amount RF_jdg corresponding to the sender signal, compares this rate of increase VF with a predetermined threshold VF_th, determines that the fuel is a transfer state in a case of the rate of increase VF being no more than the threshold VF_th, and determines that the fuel is a transfer state in a case of the rate of increase VF being greater than the threshold VF_th.

Figure 6:
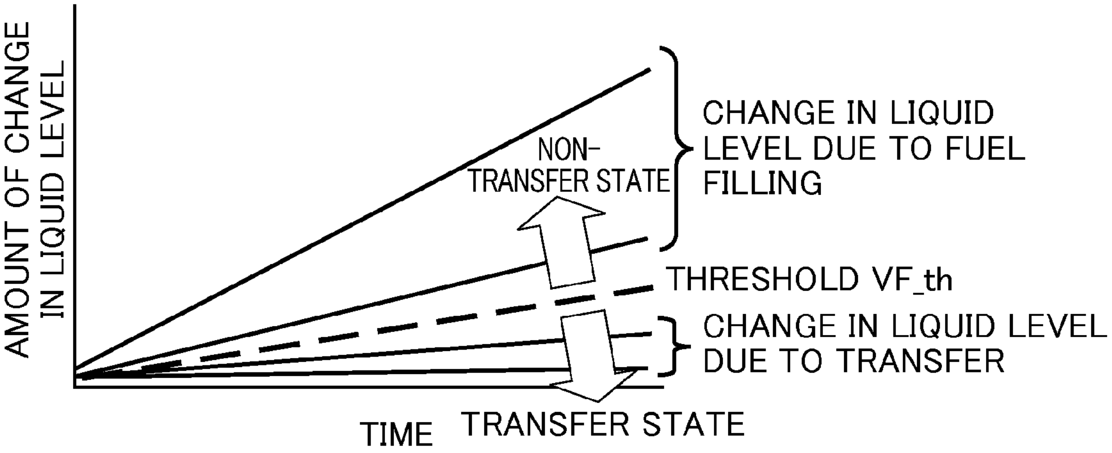
FIG. 6 is a graph comparing the amount of change in liquid level for each cause for this change.

FIG. 6 is a graph comparing the amount of change in liquid level for causes of change thereof.

The rate of increase in the fuel amount in a case of the fuel transferring through the siphon tube is less than the rate of increase in the fuel amount in a case of filling fuel by way of refueling equipment. Therefore, as described above, it is possible to determine whether the change in liquid level is due to transfer, by way of setting the threshold VF_th for the rate of increase VF in the fuel amount.

Returning to FIG. 5, the ECU calculates an increase amount WF (=RFjdg−F2) of fuel from the difference between the while-stopped detected fuel amount RF_jdg and the reference fuel amount when stopped F2, in addition to the aforementioned such rate of increase VF, and determines whether this increase amount WF exceeds a predetermined threshold WF_th. Then, in a case of it being determined that the rate of increase VF is greater than the threshold VF_th, the fuel is not the transfer state, and the increase amount WF in fuel is greater than the threshold WF_th, the ECU determines that the fuel is in the filling state (refer to time t4 in FIG. 5). In addition, the state of meter control transitions to the aforementioned fuel filling state in response to being determined that the fuel is the filling state herein, and the fuel amount inside the fuel tank is estimated after fuel filling has finished.

Furthermore, it is possible to prevent against the meter error from transfer, by inhibiting a reflection on the meter reading value in a case of being determined as the transfer state. Due to this, there will not be sudden changing when allowing a subsequent meter reading value to be reflected on the meter.

The following effects are exerted according to the present embodiment.

(1) According to the present embodiment, by determining a transfer state in which fuel transfers through the siphon tube 34, it is possible as a result to determine with high precision in a state in which fuel is being filled. In addition, since it is possible to determine with high precision in a state in which fuel is being filled, the fuel amount inside of the fuel tank can also be estimated with high precision as a result.

(2) According to the present embodiment, it is determined that the fuel is a transfer state in a case of the rate of increase VF in fuel amount calculated based on the detection value (sender signal) of the sender unit detecting the liquid level of the fuel stored in the main tank portion being no more than the threshold VF_th, and it is determined that the fuel is not a transfer state in a case of the rate of increase VF in fuel amount being greater than the threshold VF_th. Since it is thereby possible to determine a transfer state of fuel with higher precision, the estimation precision of the fuel amount inside of the fuel tank can be further raised as a result.

(3) In a case of the liquid level changing while the vehicle is stopped, the cause for this change in liquid level is considered to be fuel filling in a case of not being due to transfer. According to the present embodiment, when the vehicle is stopped, in a case of it being determined that the rate of increase VF in the fuel amount is greater than the threshold VF_th and the fuel is not the transfer state, and the increase amount WF in fuel after the vehicle has stopped being greater than the threshold WF_th, it is determined that the fuel is the fuel filling state. Since it is thereby possible to determine with high precision that fuel is the fuel filling state, the fuel amount inside of the fuel tank can be estimated with high precision as a result.

It should be noted that the present invention is not limited to the aforementioned embodiment, and various modification thereto are possible.

The invention claimed is:

1. A fuel tank system for a vehicle comprising:

a fuel tank in which a first fuel storage portion and a second fuel storage portion are formed, a siphon tube that is disposed to span the first and second fuel storage portions, and transfers fuel from either of the first and second fuel storage portions to the other of the first and second fuel storage portions, a liquid level detection unit which detects a liquid level of fuel stored in one of the first and second fuel storage portions while additional fuel is being fed into one of the first and second fuel storage portions, a transfer state determination unit which determines that fuel is in a transfer state between the first and second storage portions via the siphon tube when a rate of change in a detection value of the liquid level is not more than a first predetermined threshold, which determines that fuel is not in a transfer state between the first and second storage portions via the siphon tube when a rate of change in a detection value of the liquid level is more than the first predetermined threshold, and which also estimates an amount of fuel stored in the fuel tank based on a detection value of the liquid level detection unit, and a fuel filling state determination unit for determining that fuel is being filled into the fuel tank when the vehicle is stopped, the transfer state determination unit determines that fuel is not in the transfer state, and an amount of change in the detection value of the liquid level in a predetermined period is more than a second predetermined threshold.

2. The fuel tank system according to claim 1, wherein the transfer state determination unit includes an electronic control unit (ECU) which receives an output of the liquid level detection unit and is programmed to determine the rate of change in a detection value of the liquid level in either of the first and second fuel storage portions based on the output of the liquid level detection unit.

3. The fuel tank system according to claim 2, wherein the liquid level detection unit includes a float which is disposed in either of the first and second fuel storage portions to float on the fuel therein, and a sender unit which detects a position of the float as the liquid level of the fuel.

4. The fuel tank system according to claim 1, wherein the transfer state determination includes an electronic control unit (ECU) which receives an output of the liquid level detection unit and is programmed to determine a rate of change in a detection value of the liquid level in either of the first and second fuel storage portions based on the output of the liquid level detection unit, and the fuel filling state determination unit includes the electronic control unit (ECU) which determines that fuel is being filled into the fuel tank when the vehicle is stopped and the amount of change in the detection value of the liquid level in the predetermined period is greater than the second predetermined threshold.

5. The fuel tank system according to claim 1, wherein the fuel tank is saddle shaped with a concave recess extending upwardly at a lower surface of the tank, and the first and second fuel storage portions are disposed on opposite sides of the concave recess and open into each other through a space within the fuel tank above the concave recess.

* * * * *